Nov. 24, 1970    P. C. LAMMERS    3,542,900
SILICONE RUBBER COMPOSITION HAVING POLYESTER
FILAMENTS EMBEDDED THEREIN
Filed June 21, 1968
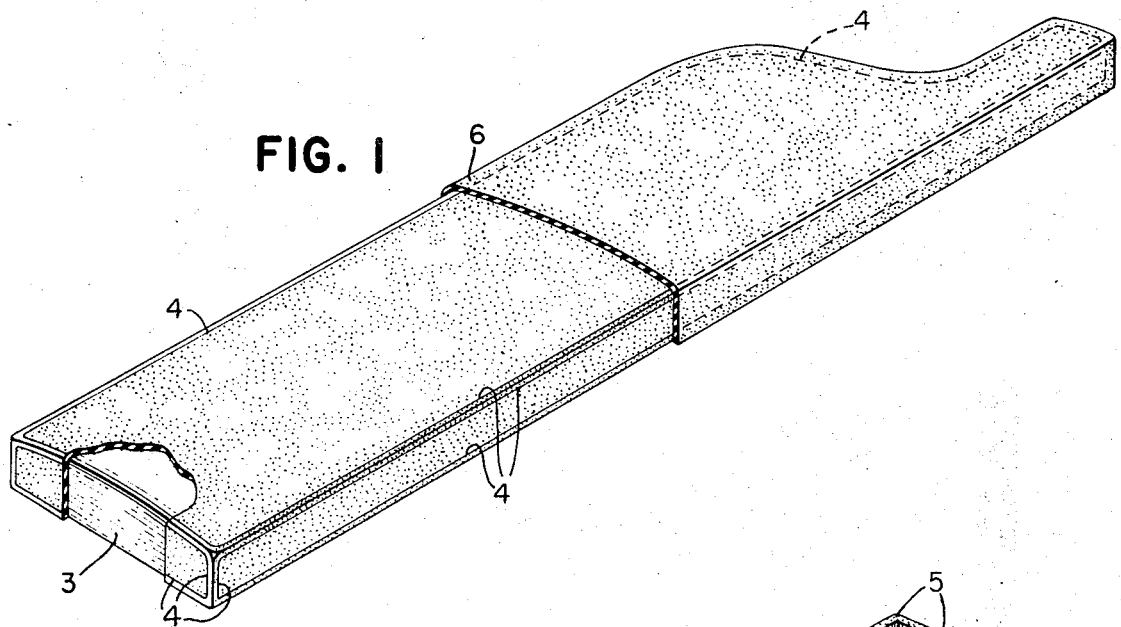
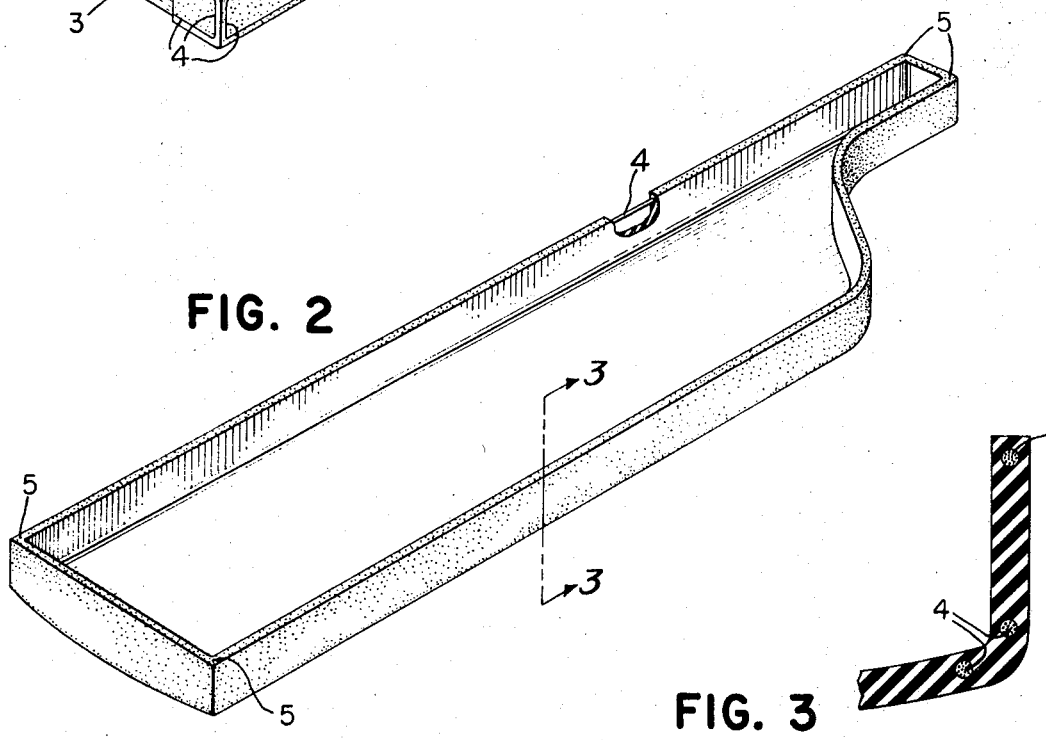
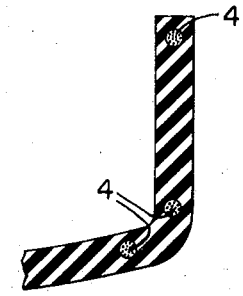
INVENTOR.
PETER C. LAMMERS
BY
ATTORNEY

United States Patent Office 3,542,900
Patented Nov. 24, 1970

3,542,900
SILICONE RUBBER COMPOSITION HAVING POLYESTER FILAMENTS EMBEDDED THEREIN
Peter C. Lammers, Doylestown, Ohio, assignor to The Goodyear Tire & Rubber Company, Akron, Ohio, a corporation of Ohio
Filed June 21, 1968, Ser. No. 739,101
Int. Cl. C08g *39/10, 47/10*
U.S. Cl. 260—824        2 Claims

ABSTRACT OF THE DISCLOSURE

This invention relates to a method of forming a cured silicone rubber composition having improved resistance to cut tear by embedding therein polyester monofilaments at least one-fourth inch in length, and to said composition.

---

This invention relates to a method of making improved articles from room temperature vulcanizable liquid silicone rubbers and to said articles. More specifically, this invention relates to a method of reinforcing vulcanized silicone rubber articles to reduce their tendency to propagate cut tear.

The so-called room temperature vulcanizable liquid silicone rubbers have been used extensively in making molds and patterns for reproducing articles, especially from polyurethanes of the spray or castable type. Also, the vulcanized silicone rubbers have found use in making other articles than molds. But unfortunately their use has been materially limited due to the inherent disadvantages of the vulcanized silicone rubbers in that they offer practically no resistance to cut tear and especially to the propagation of the cut tear when the vulcanized silicone rubber is bent.

An object of this invention is to provide a method of reinforcing the vulcanized silicone rubbers whereby their tendency to propagate cut tear is materially reduced.

This object and other advantages of this invention may be more readily appreciated by reference to the drawings where FIG. 1 is a perspective view of an automobile A-post element which is used to prepare a vulcanized silicone rubber mold. FIG. 2 is a perspective view of the silicone rubber mold prepared on the automobile A-post element of FIG. 1 and FIG. 3 is a cross-sectional view through FIG. 2 along line 3—3.

Referring to FIG. 1, numeral 3 indicates an automobile A-post element having a polyvinyl chloride skin and a polyurethane foam core. This A-post element is given one or more coats of a liquid silicone rubber, and then along the edges and corners, strands of a polyester monofilament is applied in the manner shown by numeral 4. These polyester monofilaments are pressed or worked into the surface of the liquid silicone rubber 6 as untwisted strands of polyester monofilaments and then additional coats of the liquid silicone rubber is applied over the previous coat or coats of liquid silicone rubber on the automobile A-post element. The liquid silicone rubber is applied until sufficient thickness is obtained, usually about ⅛ to ¼ inch thick to give a suitable mold for preparing polyurethane A-post skins by spraying with a liquid polyurethane reaction mixture. The silicone rubber coated on the A-post element is allowed to stand at room temperature or slightly higher, say at 100 to 200° F. until the liquid silicone rubber is vulcanized. Then the vulcanized covering over the A-post element is stripped therefrom by taking it with the hands and stretching it sufficiently to remove it from the A-post element to give a mold such as that shown in FIG. 2.

The mold shown in FIG. 2 shows remarkable resistance to cut tear and even if a small cut is made in one of the corners 5 the cut propagation does not extend in the normal manner associated with the use of vulcanized silicone rubbers.

Representative of the room temperature vulcanizing liquid silicone rubbers useful in this invention are those described as organopolysiloxane compositions containing silicon-bonded hydroxyl groups which can be cured by metal salts of organic carboxylic acids, by quaternary ammonium compounds or by epoxide containing compounds in the presence of primary, secondary or tertitary amines.

In general, these silanol-containing organopolysiloxanes contain an average of from about 1.0 to 1.98 organic groups attached to silicon through silicon-carbon linkages, and contain an average of from 0.01 to 1 silicon-bonded hydroxyl groups per silicon atom. Alternatively, some of the silicon-bonded hydroxyl groups can be replaced with alkoxy groups or with pendant hydrogen atoms.

These compositions can be described as having the average formula (1) 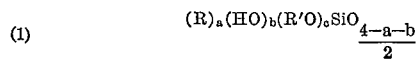

where R is a monovalent hydrocarbon radical or a substituted monovalent hydrocarbon radical, R′ is an alkyl radical containing from 1 to 8 carbon atoms, $a$ has a value of from 1.0 to 1.98, $b$ has a value from 0.01 to 1, $c$ has a value of from 0 to 0.99, the sum of $b+c$ is from 0.01 to 1, and the sum of $a+b+c$ is from 1.01 to 2.1. Included among the radicals represented by R are, for example, alkyl radicals, e.g., methyl, ethyl, propyl, butyl, octyl, decyl, etc. radicals; aryl radicals, e.g., phenyl naphthyl, xylyl, tolyl, etc. radicals; aralkyl radicals, e.g., benzyl, phenyl-ethyl, styryl, etc. radicals; alkenyl radicals, e.g., vinyl, allyl, etc., radicals; cycloaliphatic hydrocarbon radicals, e.g., cyclohexyl, cycloheptyl, cyclohexenyl, etc. radicals; cyanoalkyl radicals, e.g., cyanoethyl, cyanomethyl, cyanopropyl, etc., radicals; halogenated monovalent hydrocarbon radicals, e.g., chloromethyl, bromomethyl, chloroethyl, chlorophenyl, tetrachlorophenyl and dibromophenyl radicals.

Representative of the millable silicon rubber gums are those described as: organo-substituted polysiloxanes, commonly called dialkyl or alkyl-aryl polysiloxane gums. The substituted groups are usually at least 50 percent in number methyl groups. The remainder of the groups are usually methyl or methyl with 5 to 20 percent phenyl or menthyl with phenyl and vinyl, or methyl, vinyl or cyanopropyl groups, methyl vinyl and ethyl groups, or methyl and trifluoropropyl groups. The millable silicone rubber gums can be shown by the empirical formula

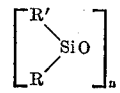

where R and R′ are selected from the class consisting of the methyl and ethyl groups, the halogen and nitrile substituted alkyl groups containing from 1 to 4 carbon atoms, phenyl, halogenated phenyl, vinyl and cyclohexenyl groups and $n$ is a large number. R and R′ may, if desired, be predominately or entirely methyl groups.

The millable gum silicone rubbers are generally cured by reacting the poly(organosiloxane) with a peroxide such as 2,4-dichlorobenzoyl peroxide, di-(tertiarybutyl)perbenzoate, tertiarybutyl perbenzoate, benzoyl peroxide or dicumyl peroxide. Usually about from 0.5 to 15 and preferably 1.0 to 3.0 parts of curing agent per 100 parts by weight of silicone rubber are used, depending on the percentage of unsaturated substitution present.

Various fillers can be added to the silicone rubber before curing, typical of which are, for example, fume silicas, silica aerogels, organo-silane modified silicas, barium and cadmium titanates, zirconates and stannates; diatomaceous earth, clays, calcium carbonate, finely ground quartz, barytes, iron oxide, zinc oxide, titanium dioxide and mixtures thereof.

The cured silicone rubbers have various physical properties. For example, they may have tensile strengths from about 100 to about 1000 pounds per square inch, elongations of from about 100 to 600 percent and a Durometer hardness, Shore A scale of from about 20 to about 60, but practically no resistance to cut tear propagation.

The polyesters and copolyesters used in practicing the invention comprise fiber forming polycondensation products of one or more aromatic dicarboxylic acids with one or more aliphatic, alicyclic or aromatic glycols having melting points about 260° F. Suitable polyesters which may be used in practicing the invention are the polyalkylene terephthalates produced in accordance with U.S. Pat. No. 2,465,319 to Whinfield et al., of Mar. 22, 1949. These polymeric linear terephthalic esters are composed of recurring structural units of the formula:

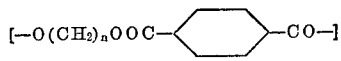

wherein $n$ represents an integer within the range of 2 to 10. Copolyesters composed of linear molecules of high average molecular weight in which two kinds of repeating units, ethylene terephthalate;

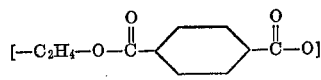

and ethylene isophthalate

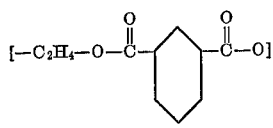

are distributed at random along the polymer chain, as disclosed in U.S. Pat. No. 2,965,613 to Millone et al. of Dec. 20, 1960 may be applied to the invention.

Another copolyester which may be used in practicing the invention is a blend of 30/70 cis-trans poly (1,4-cyclohexylene-dimethylene terephthalate) which is sold by Eastman Kodak Company under the trademark "Kodel."

The polyester yarns and monofilaments are spun, drawn and heat set by the conventional processes disclosed in the prior art, but the best results are obtained where the continuous filaments are grouped together in strands which are untwisted. Although continuous strands are preferred, some of the improvement in cut resistance is evident even where strands are one-fourth of an inch in length and at one-half to one inch very noticeable.

The objects and advantages of this invention can more readily be understood by reference to the representative example wherein all parts are by weight unless otherwise designated.

EXAMPLE I

A Ford A-post element having an ABS (acrylonitrile-butadiene-styrene) skin over a flexible foam core was cleaned by wiping with a high boiling hydrocarbon solvent in which ABS is not soluble and then allowed to dry at room temperature. The dry and clean Ford A-post element was spray coated with a toluene dispersion of silicone rubber, Silastic 588, a product of Dow Corning Company containing between one to five percent by weight of stannous octoate to give a film 25 mils thick.

The silicone rubber coating was dried at room temperature until it set to a solid or was tack-free. Then a further coating of silicone rubber, Silastic 588, and one to five percent stannous octoate was applied to the coating in the area indicated by the numeral 4 of FIG. 1. Then a continuous untwisted polyester fiber prepared from polyethylene adipate was pressed into the fluid coating in the area shown by the numeral 4 in FIG. 1. This Ford A-post element having the silicone coating was placed in an oversize retaining mold where the clearance between the Ford A-post and the inside surface of the retaining mold was approximately one-fourth inch. The empty space between the retaining mold and the Ford A-post element was filled by pouring the above toluene dispersion of the silicone into the empty space and allowing it to stand until the silicone rubber had set. In some instances the setting or curing of the silicone rubber was achieved by letting it stand at room temperature for about 36 hours and in other instances the cure was achieved by placing the retaining mold with the silicone rubber dispersion therein in a hot air oven and curing for about six hours at 180° F. When the silicone rubber had set, the Ford A-post element was removed from the retaining mold along the silicone mold formed thereon. The silicone mold was stripped from the Ford A-post element by subjecting the silicone covering to sufficient hand pressure to remove it from the A-post element.

This silicone mold was placed in a retaining mold and then the inside cavity was given a spray coat of a fluid polyurethane reaction mixture comprising a prepolymer of one mold of a poly (ethylene-propylene) adipate of 2000 molecular weight with 2 mols of a commercial 80/20 isomeric mixture of toluene diisocyanate and 0.8 mol of methylene dichloroaniline and allowed to cure and set of form a polyurethane skin for a Ford A-post element. This polyurethane skin was stripped from the silicone mold and placed in a retaining mold where a foamable polyurethane mixture was added to form a Ford A-post element having a polyurethane skin and a polyurethane foam core.

The polyurethane foamable mixture used was formed by mixing one mol of a polypropylene ether diol-triol mixture of about 2000 molecular weight, 1.5 mols of toluene diisocyanate, 0.2 to .3 mols of water and about five percent dichlorofluoroethane. This mixture was poured into the mold and allowed to foam and fill the mold. When the foam had cured, a finished A-post element was removed from the mold. The mold was used for making several A-post elements without cracking or failing.

In another example a liquid silicone rubber was mixed with three to five percent of stannous octoate as a curative and cast on a plate as a film and then an unsaturated continuous polyester fiber was pressed by rubbing with the hand into the film to give it fiber reinforcement throughout its length and width. Then more of the liquid silicone rubber with its curative was spread over the fibers to give a sheet approximately a quarter of an inch thick. This sheet was air cured and could be bent through an arc of 180° without breaking even when scratched with a sharp pointed instrument while in the bent condition.

While certain representative embodiments and details have been shown for the purpose of illustrating the invention, it will be apparent to those skilled in this art that various changes and modifications may be made therein without departing from the spirit or scope of the invention.

What is claimed is:

1. A cured silicone rubber composition of at least one-eighth to about one-fourth inch thickness having an improved resistance to cut tear, comprising a cured silicone rubber having embedded therein polyester fabric filaments at least one-fourth inch in length, wherein the silicone rubber is a cured silanol-containing organopolysiloxane containing an average of from about 1 to 1.98 organic groups attached to silicon through silicon carbon linkages and containing an average of from .01 to 1 silicon bonded hydroxyl group per silicon atom and the polyester is the polycondensation product of at least one aliphatic or aromatic glycol.

2. The composition of claim 1 wherein the filaments are grouped together in untwisted strands.

References Cited

UNITED STATES PATENTS 2,827,099  3/1958  Youngs  152—359
3,113,369  12/1963  Barrett et al.  152—359

FOREIGN PATENTS

Ad. 68,697  1/1958  France.
                    1st Add. to 1,045,194

SAMUEL H. BLECH, Primary Examiner

U.S. Cl. X.R.

18—47; 161—144, 170; 249—134